US012762528B2

(12) United States Patent
Lin et al.

(10) Patent No.: US 12,762,528 B2
(45) Date of Patent: Oct. 13, 2026

(54) METHODS AND SYSTEMS FOR GENERATING SHORT AND READABLE TRANSACTION REFERENCE NUMBERS USING PROOF-OF-WORK

(71) Applicant: JPMorgan Chase Bank, N.A., New York, NY (US)

(72) Inventors: Bill S. Lin, San Jose, CA (US); Yujie Liu, Redwood City, CA (US); Abhijeet Wadkar, Fremont, CA (US); Anthony Bajoua, West Bloomfield, MI (US); Xiaoxiao Ren, Mountain View, CA (US); Jing Yu, Sunnyvale, CA (US); Yunfei Gao, Santa Clara, CA (US); Sahil Verma, Redwood City, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 122 days.

(21) Appl. No.: 18/654,258

(22) Filed: May 3, 2024

(65) Prior Publication Data

US 2025/0342455 A1 Nov. 6, 2025

(51) Int. Cl.

*G06Q 20/00* (2012.01)
*G06Q 20/20* (2012.01)

(52) U.S. Cl.

CPC .................................. *G06Q 20/209* (2013.01)

(58) Field of Classification Search

CPC .................................................... G06Q 20/209
See application file for complete search history.

(56) References Cited

U.S. PATENT DOCUMENTS

| | | | | |
|---|---|---|---|---|
| 2019/0122185 | A1* | 4/2019 | Koeppel | G06Q 20/047 |
| 2019/0228408 | A1* | 7/2019 | Singh | G06Q 20/027 |
| 2021/0319437 | A1* | 10/2021 | Johnson | G06Q 20/383 |

FOREIGN PATENT DOCUMENTS

| | | | | |
|---|---|---|---|---|
| WO | WO-2019147340 A1 * | 8/2019 | | G06Q 20/065 |

* cited by examiner

*Primary Examiner* — Rokib Masud
(74) *Attorney, Agent, or Firm* — Guntin & Gust, PLC; Kenneth S. Kwan

(57) ABSTRACT

Aspects of the subject disclosure may include, for example, receiving, from a transaction terminal, a request for reference IDs, based on the receiving, providing, to the transaction terminal, a proof-of-work problem for the transaction terminal to solve, after the providing, receiving, from the transaction terminal, a solution to the proof-of-work problem, performing one or more actions to verify the solution, based on successful verification of the solution, transmitting a range of reference IDs to the transaction terminal, thereby enabling the transaction terminal to utilize the range of reference IDs in relation to transaction processing. Other embodiments are disclosed.

20 Claims, 5 Drawing Sheets

100

300

350

METHODS AND SYSTEMS FOR GENERATING SHORT AND READABLE TRANSACTION REFERENCE NUMBERS USING PROOF-OF-WORK

FIELD OF THE DISCLOSURE

The subject disclosure relates to methods and systems for leveraging proof-of-work to securely generate short (and more readable) transaction reference numbers for receipts printed/provided by a terminal.

BACKGROUND

In a card-present transaction, a customer presents a physical payment card to a merchant's terminal at the point of sale (POS). The customer typically receives a receipt for the transaction with a reference number or ID, which the customer can use to reference the transaction if there is an issue or if a refund is to be processed. The merchant may also store a record of the transaction using the reference ID, either in merchant software or elsewhere.

SUMMARY OF THE DISCLOSURE

One or more aspects of the subject disclosure include a device, comprising a processing system including a processor, and a memory that stores executable instructions that, when executed by the processing system, facilitate performance of operations. The operations can include receiving, from a transaction terminal, a request for reference IDs. Further, the operations can include based on the receiving, providing, to the transaction terminal, a proof-of-work problem for the transaction terminal to solve. Further, the operations can include after the providing, receiving, from the transaction terminal, a solution to the proof-of-work problem. Further, the operations can include performing one or more actions to verify the solution. Further, the operations can include based on successful verification of the solution, transmitting a range of reference IDs to the transaction terminal, thereby enabling the transaction terminal to utilize the range of reference IDs in relation to transaction processing.

One or more aspects of the subject disclosure include a non-transitory machine-readable medium, comprising executable instructions that, when executed by a processing system including a processor, facilitate performance of operations. The operations can include transmitting, to an ID generator, a request for reference IDs. Further, the operations can include after the transmitting, receiving, from the ID generator, a proof-of-work problem to be solved. Further, the operations can include performing one or more actions to solve the proof-of-work problem, resulting in a determined solution. Further, the operations can include sending the determined solution to the ID generator. Further, the operations can include after the sending, obtaining, from the ID generator, a range of reference IDs for use with transaction processing.

One or more aspects of the subject disclosure include a method. The method can comprise receiving, by a processing system including a processor, and from a transaction terminal, a request for reference IDs. Further, the method can include based on the receiving, providing, by the processing system, and to the transaction terminal, a cryptographic challenge puzzle for the transaction terminal to solve. Further, the method can include after the providing, receiving, by the processing system, and from the transaction terminal, a solution to the cryptographic challenge puzzle. Further, the method can include performing, by the processing system, one or more actions to verify the solution. Further, the method can include based on successful verification of the solution, transmitting, by the processing system, a range of reference IDs to the transaction terminal, thereby enabling the transaction terminal to print or include respective reference IDs in the range of reference IDs on receipts for individual card-present transactions.

BRIEF DESCRIPTION OF THE DRAWINGS

Reference will now be made to the accompanying drawings, which are not necessarily drawn to scale, and wherein.

DETAILED DESCRIPTION

Figure 1:
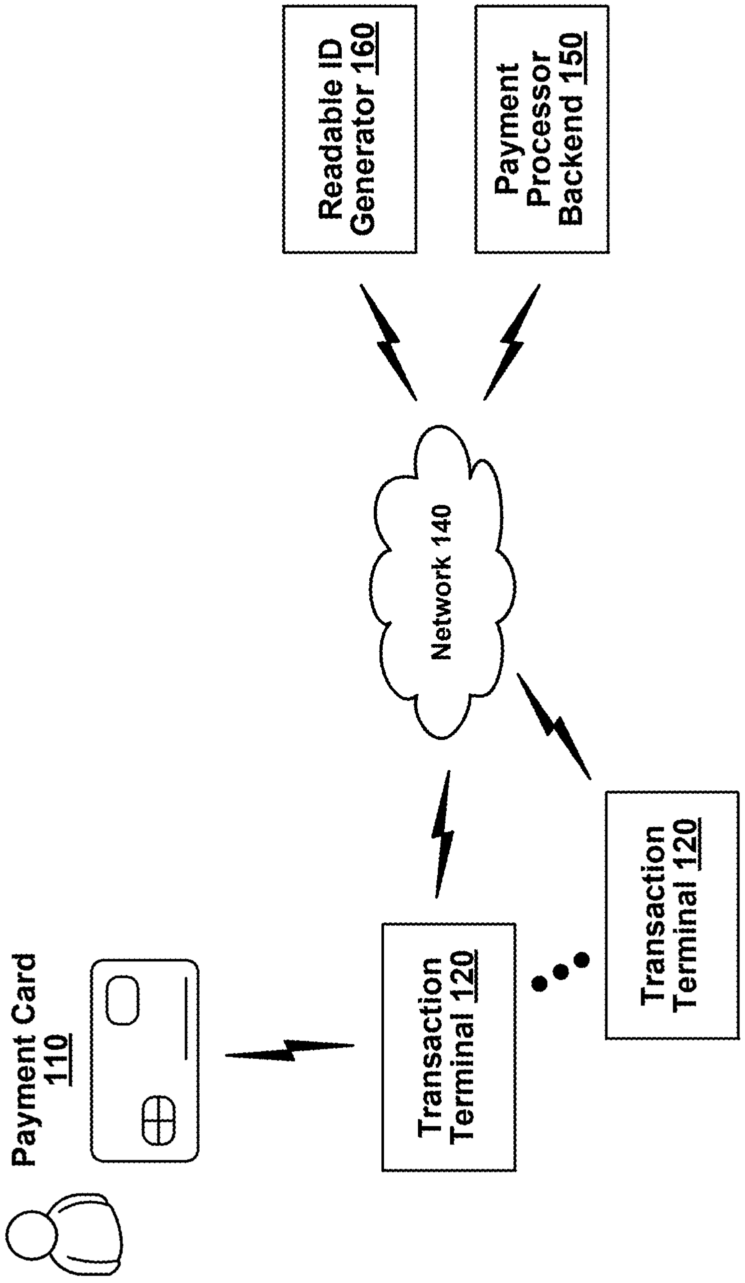
FIG. 1 is a diagram of an example environment in which systems, devices, and/or methods, described herein, may be implemented in accordance with various aspects described herein.

Many payment processing systems prompt clients (e.g., software agents in transaction terminals) to pass in or provide merchant order numbers, which the systems then use as transaction reference IDs for various purposes, such as order accounting and tracing, refund tracking, fund transfers, and so on. There are different ways that a terminal can generate these numbers. An obvious solution is to generate the reference ID based on randomness. This involves generating a value, such as a Universally Unique Identifier (UUID), that has a sufficient number of bits of randomness (normally 128 bits) to guarantee that no two transactions end up with the same reference ID. Assuming that the ID is encoded using base32, this would result in a 26 character reference ID. While encoding in this manner may allow the number to be read over the phone, the number is nevertheless long and thus cumbersome to communicate in a conversation.

Another solution is to leverage a readable ID generator (e.g., similar to a short uniform resource locator (URL) generator) to generate the reference IDs for the merchant terminals. The drawback to this is that merchant credentials may need to be established in order to secure the communications between a terminal and the generator. This would require the merchant to manually enter credentials to access the generator, which can be a hassle. A password management system would also need to be configured to handle such access, which increases system complexity. A secret key can perhaps alternatively be stored on the terminal itself, but this would not be as secure since it can be hacked and thus the merchant may need to regularly rotate/change the keys, certificates, etc. to maintain some level of security.

The subject disclosure describes, among other things, illustrative embodiments of a method for generating short and readable IDs that can be used as transaction reference IDs. In exemplary embodiments, aspects of the method may be implemented in a readable ID generator and a transaction terminal. For instance, in one or more embodiments, the transaction terminal may be configured to submit a request to the readable ID generator (e.g., via an application programming interface (API) call) for readable IDs, and the readable ID generator may respond to the transaction terminal with a cryptographic challenge puzzle (e.g., "find a string such that, when the string is concatenated with the current timestamp and a secure hash algorithm (SHA)-256 hash is operated thereon, the resulting hash value has ten leading zeros."). The transaction terminal may solve and provide the solution to the readable ID generator, which may verify the solution. Upon verification, the readable ID generator may provide a range of readable IDs (e.g., a batch of 100 reference IDs, 200 reference IDs, 1,000 reference IDs, etc.) to the transaction terminal that the terminal can use as transaction reference IDs.

Exemplary embodiments of the method facilitate the request for and the generation and provision of readable IDs in a manner that obviates the need for secrets, such as credentials or passwords, or the establishment of any level of trust. This alleviates the burden on terminal operators (e.g., merchants) to perform password management, secret key rotations, or the like, which makes the terminals easier to use and service. The readable IDs are also relatively short compared to randomly-generated IDs, which allows for much quicker and easier verbal communication (e.g., during customer service calls). The readable ID generator, or APIs thereof, may not be open for public access, which lowers the chance of malicious attacks. Controlling readable ID generation/distribution based on proof-of-work challenges also discourages such attacks given that a hacker would need to spend compute cycles in order to request information from the generator, resulting in asymmetric losses in terms of resources. That is, the hacker must expend a lot of resources just to obtain IDs from the generator that are essentially useless since those IDs, now having been issued solely to the hacker, would not be associated with any valid transactions.

FIG. 1 is a diagram of an example environment 100 in which systems, devices, and/or methods, described herein, may be implemented in accordance with various aspects described herein. As shown in FIG. 1, environment 100 may include a payment card 110, transaction terminal(s) 120, a network 140, a payment processor backend 150, and a readable ID generator 160. The devices in environment 100 may communicate with one another via wired connections, wireless connections, or a combination thereof.

The payment card 110 may be a transaction card that is capable of storing and/or communicating data for a PoS transaction with the transaction terminal 120. The payment card 110 may store or communicate data, such as, for instance, account data (e.g., an account ID, a cardholder ID, etc.), banking data, transaction data (e.g., payment token(s)), expiration data, and/or the like. The payment card 110 may include a magnetic stripe and/or an integrated circuit (IC) chip that facilitates storing/communication of the data. In one or more embodiments, the payment card 110 may include an antenna for communicating with the transaction terminal 120, such as a passive radio frequency (RF) antenna, an active RF antenna, a battery-assisted RF antenna, or the like. In some embodiments, the payment card 110 may be a smart transaction card that is capable of communicating wirelessly (e.g., via Bluetooth, Bluetooth Low Energy (BLE), near-field communication (NFC), and/or the like) with the transaction terminal 120.

A transaction terminal 120 may include one or more devices that are capable of facilitating processing of transactions made via a payment card 110. In exemplary embodiments, the transaction terminal 120 may be a PoS terminal that facilitates card-present transactions. In one or more embodiments, the transaction terminal 120 may additionally, or alternatively, be an automated teller machine (ATM) terminal, a security access terminal, or the like. The transaction terminal 120 may include one or more input/output devices for interacting with a payment card 110, such as, for instance, a touchscreen, a magnetic stripe reader (i.e., that receives data as a magnetic stripe of the payment card 110 is swiped along the reader), a number keypad, a chip reader (i.e., that receives data from an IC chip of the payment card 110 when the card is positioned onto the reader), an RF signal reader (i.e., that wirelessly receives data from the payment card 110 when the card is positioned within a detectable range of the reader), and/or the like. In one or more embodiments, the transaction terminal 120 may be equipped with hardware, software, or a combination of both that is configured to perform computations for proof-of-work problems (e.g., cryptographic challenge questions). In various embodiments, the transaction terminal 120 may expose one or more APIs that define methods and data formats for interacting with the problem solving functionality.

The network 140 may include one or more wired and/or wireless networks, such as, for instance, a cellular network (e.g., a 4G network, a 5G network, or a higher generation network), a public land mobile network (PLMN), a metropolitan area network (MAN), a telephone network (e.g., the Public Switched Telephone Network (PSTN)), a local area network (LAN), a wide area network (WAN), a private network, an ad hoc network, an intranet or the Internet, a fiber optic-based network, a cloud computing network, any other similar network, or a combination of some or all of these networks and/or other types of networks.

The payment processor backend 150 may include one or more devices that are associated with one or more financial institutions (e.g., banks) and/or payment card associations. The device(s) may be configured to authorize transactions and facilitate payments or transfers of funds between cardholder accounts associated with payment cards 110 and accounts associated with transaction terminals 120. In exemplary embodiments, the payment processor backend 150 may include one or more devices that are owned or operated by one or more issuing banks associated with a cardholder of the payment card 110, one or more devices owned or operated by one or more acquiring (or merchant) banks associated with the transaction terminal 120, and/or one or more devices associated with one or more card associations associated with the payment card 110. When data associated with the payment card 110 is received from the transaction terminal 120, banking institution(s) and/or card associations may communicate to facilitate authorization of the transaction and/or transfer funds between the accounts associated with the payment card 110 and the transaction terminal 120.

The readable ID generator 160 may include one or more devices that are capable of generating unique identifiers. These unique identifiers may be short and thus easy for a human to read and possibly even remember-hence "readable IDs." As an example, a readable ID may range in length from about six characters to about twelve characters. In some implementations, a readable ID may be limited to no more than a certain threshold number of characters (e.g., no more than fifteen characters) so as to ensure reasonable readability of the ID. In any case, the characters may include letters, digits, symbols, or any combination thereof. In various embodiments, the readable ID generator 160 may be associated with (e.g., operated by) a financial institution (e.g., a bank) with which an operator of the transaction terminal 120 (e.g., a merchant) has an account. In one or more embodiments, the readable ID generator 160 may expose one or more APIs that define methods and data formats for interacting with the ID generation functionality.

Figure 2:
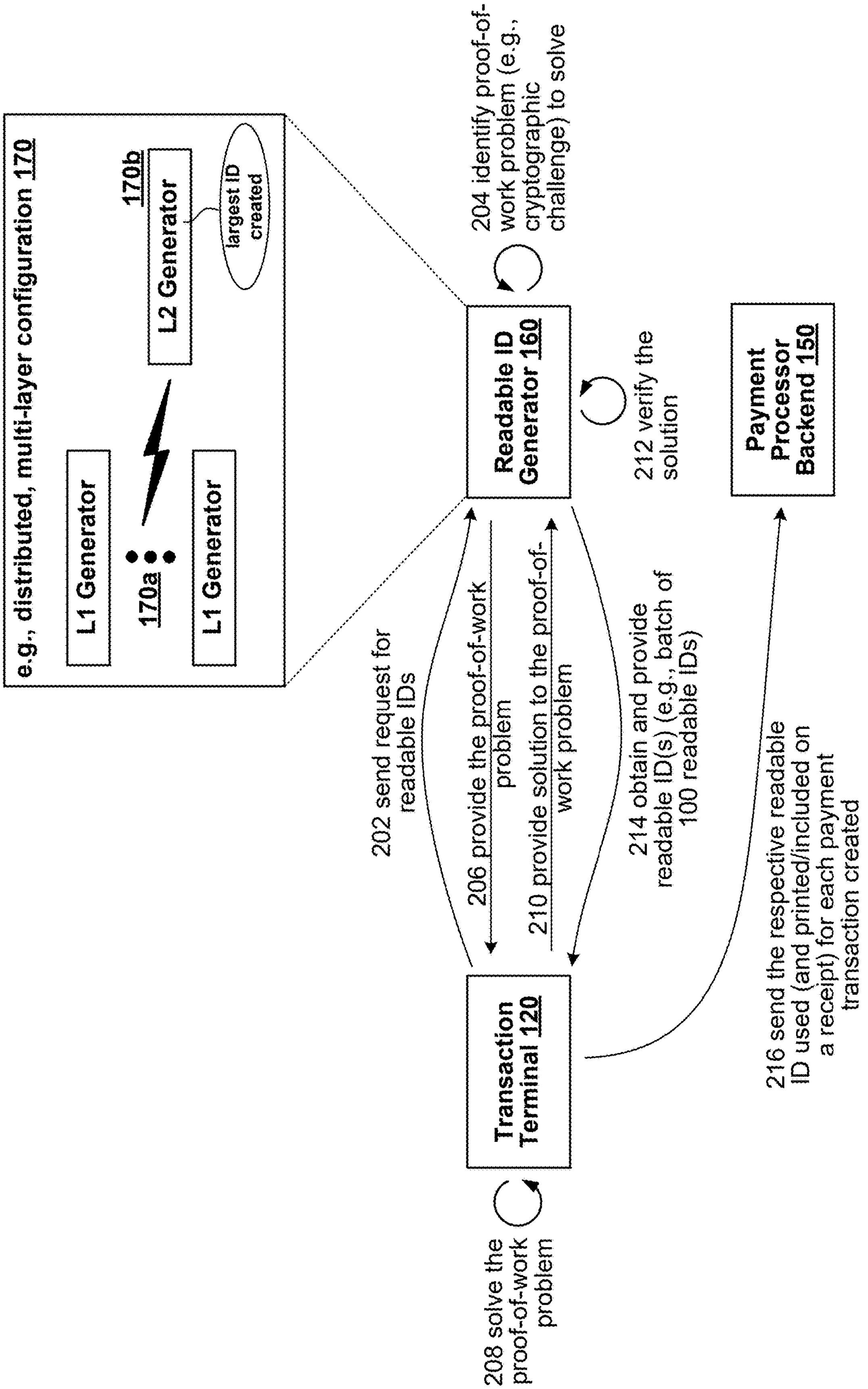
FIG. 2 illustrates an example, non-limiting embodiment of a method for facilitating readable ID generation and distribution in accordance with various aspects described herein.

FIG. 2 illustrates an example, non-limiting embodiment of a method for facilitating readable ID generation and distribution in accordance with various aspects described herein. As depicted, the method may involve a transaction terminal 120 and the readable ID generator 160, and may result in allocation of readable IDs for the transaction terminal 120 that the terminal can use and send to the payment processor backend 150 for payment processing purposes.

At 202, the transaction terminal 120 may send a request to the readable ID generator 160 for readable IDs. For instance, the transaction terminal 120 may transmit an API call to the readable ID generator 160. In some embodiments, the transaction terminal 120 may send the request periodically or based on threshold conditions being satisfied (e.g., based on the number of remaining readable IDs available to the transaction terminal 120 falling below a limit).

At 204, the readable ID generator 160 may identify one or more proof-of-work problems (e.g., cryptographic challenge(s)) for the transaction terminal 120 to solve. An example cryptographic challenge may be to find a string such that, when the string is concatenated with the current timestamp and a SHA-256 hash is operated thereon, the resulting hash value has ten leading zeros. It will be understood and appreciated that numerous cryptographic challenges are possible, some of which may require more or less compute power than others. In some embodiments, the readable ID generator 160 may identify a proof-of-work problem that is determined to take no more than a certain period of time to compute (e.g., two seconds, five seconds, etc.) by particular hardware that the transaction terminal 120 is assumed or known to be equipped with. In various embodiments, the readable ID generator 160 may have access to a repository of proof-of-work problems, and may identify the one or more proof-of-work problems from the repository. In one or more embodiments, the readable ID generator 160 may modify a proof-of-work problem that is selected from the repository before presenting it to a transaction terminal 120 so as to avoid reuse or overuse of the same problem with different terminals.

At 206, the readable ID generator 160 may provide the proof-of-work problem(s) to the transaction terminal 120. For instance, the readable ID generator 160 may respond to the API call (e.g., by transmitting a response API call to the transaction terminal 120) with information regarding the proof-of-work problem(s) to be solved. At 208, the transaction terminal 120 may attempt to solve the proof-of-work problem(s). For instance, in the case of the aforementioned string problem, the transaction terminal 120 may attempt to solve the problem by trying random strings until it finds one that meets the criteria.

At 210, the transaction terminal 120 may provide the solution(s) to the readable ID generator 160. For instance, the transaction terminal 120 may transmit an API call to the readable ID generator 160 with the solution(s) to the proof-of-work problem(s) (e.g., along with information regarding the communications between the two devices thus far as needed to facilitate tracking of the queries/responses).

The readable ID generator 160 may, at 212, verify the solution(s), and at 214, obtain and provide one or more (e.g., a batch or a range of) readable IDs to the transaction terminal 120. The transaction terminal 120 may then use respective readable IDs as the transaction reference ID for each transaction and send (216) this information to the payment processor backend 150 for processing. For instance, the transaction terminal 120 may use a first readable ID as the transaction reference ID (which may be printed/included on a first receipt) for a first transaction, a second readable ID as the transaction reference ID (which may be printed/included on a second receipt) for a second transaction, and so on. In a case where the readable ID generator 160 returns a range of readable IDs, perhaps in the range between 1000 and 1100, then the transaction terminal 120 can process the next 100 payments and print/include respective ones of the numbers 1000 to 1100 on the individual receipts for those 100 payments. Of course, it will be understood and appreciated that 1000-1100 is merely exemplary, and one can easily add letters and base32 encode the binary numbers to keep the readable IDs shorter.

In certain embodiments, the readable ID generator 160 may be capable of managing (e.g., keeping track of) generated readable IDs. In one or more embodiments, the readable ID generator 160 may be capable of obtaining, storing, and/or analyzing information regarding accounts and/or transaction terminals 120 to which generated readable IDs have been issued, information regarding merchant preferences, information regarding the locations of transaction terminals 120, information regarding network connectivity associated with transaction terminals 120, and/or the like.

In some embodiments, the readable ID generator 160 may be implemented or distributed in multiple (two or more) layers. For instance, as depicted in FIG. 2, the readable ID generator 160 may be implemented in a two-layer configuration 170, with multiple first layer (L1) generators **170*a* and a second layer (L2) generator 170*b*. The L1 generators 170*a* may each interact with a select number of transaction terminals 120 to receive requests for readable IDs and to respond to those requests. Upon receiving a request from a transaction terminal 120, an L1 generator 170*a* may determine and provide a proof-of-work problem for the transaction terminal 120 to solve, and return one or more (e.g., a batch or a range of) readable IDs to the transaction terminal 120 if the terminal submits a solution to the problem that the L1 generator 170*a* verifies to be correct. In certain embodiments, the L1 generator 170*a* may alternatively query the L2 generator 170*b* for the proof-of-work problem. In these embodiments, the L2 generator 170*b* may determine and provide the problem, and the L1 generator 170*a* may present the problem to the transaction terminal 120 and either verify the solution that the terminal responds with or forwards the solution to the L2 generator 170*b* for verification. In either case, the L1 generator 170*a* may return readable ID(s) to the transaction terminal 120 if the submitted solution has been verified. Of course, numerous other implementations are possible. For instance, in response to a request from a transaction terminal 120 for readable IDs, the L1 generator 170*a* may determine and provide a first proof-of-work problem to the terminal to solve as well as query the L2 generator 170*b* for a second proof-of-work problem for the terminal to solve. In this example, the L1 generator 170*a* may return one or more (e.g., a batch or a range of) readable IDs to the transaction terminal 120 only if the terminal provides verified solutions to both of the problems. In configurations where the L2 generator 170*b* is implemented in a protected network that can (e.g., only) be accessed by L1 generators 170*a***, a second layer of proof-of-work may or may not be needed. That is, having proof-of-work in the L1 layer may suffice since it is this L1 layer that would be, for instance, open to the Internet for terminals to connect with and the number of L1 hosts are generally stable in practice. Thus, depending on the configuration, multiple layers of proof-of-work may or may not be needed.

In various embodiments, the L2 generator 170*b* may issue batches of readable IDs to L1 generators 170*a* either periodically or based on threshold conditions being satisfied (e.g., based on the number of remaining readable IDs at an L1 generator 170*a* falling below a limit). The L2 generator 170*b* may keep track of the largest readable ID thus far created and issued, and may increment this tracked value as more readable IDs are generated and issued to the L1 generators 170*a*. For instance, in a case where the current largest readable ID is Largest_ID, and where 10,000 readable IDs are generated and issued to a given L1 generator 170*a*, the L2 generator 170*b* may increment Largest_ID by 10,000. In this way, the L2 generator 170*b* may properly manage readable ID generation and distribution even in a cases where numerous (e.g., hundreds, thousands, millions of) transaction terminals 120 are serviced by numerous (e.g., hundreds, thousands of) L1 generators 170*a*.

In some embodiments, the readable ID generator 160 (e.g., an L1 generator 170*a* and/or the L2 generator 170*b*) may verify a solution from a transaction terminal 120 only if it exactly matches a predetermined correct solution. In other embodiments, the readable ID generator 160 may verify a solution from a transaction terminal 120 even if it does not exactly match a predetermined correct solution. For instance, in a case where the problem is to find a string such that, when the string is concatenated with the current timestamp and a SHA-256 hash is operated thereon, the resulting hash value has ten leading zeros, then the readable ID generator 160 may determine that a solution is "correct" if the number of leading zeros in the solution satisfies a threshold value (e.g., is equal to or greater than eight or nine). Or, the readable ID generator 160 may determine that a solution is "correct" if a Hamming distance (i.e., the number of positions in which the values/bits are different) satisfies a threshold (e.g., is less than a threshold number). A less optimal or partially correct solution may be acceptable particularly in cases where the transaction terminal 120 has limited processing power. In some implementations, the readable ID generator 160 may, based on determining that the transaction terminal 120 has limited processing power, analyze a submitted sub-optimal solution using artificial intelligence (AI)/machine language (ML) techniques to determine whether the request is legitimate.

In one or more embodiments, the readable ID generator 160 may throttle, or otherwise control, generation/distribution of readable IDs depending on information associated with the requesting transaction terminals 120. As an example, in some embodiments, the readable ID generator 160 may obtain, store, and/or analyze information regarding a merchant account that is associated with a transaction terminal 120 (e.g., the type of business that the merchant is engaged in). In these embodiments, the readable ID generator 160 may generate/distribute a larger number of readable IDs per request if the readable ID generator 160 determines that the merchant is engaged in a particular type of business that is likely to handle a larger number of transactions on an hourly/daily/weekly/monthly/etc. basis (e.g., an ice cream shop) as opposed to a different type of business that is likely to handle much fewer transactions (e.g., a furniture store). As another example, in some embodiments, the readable ID generator may obtain, store, and/or analyze information regarding the location of a transaction terminal 120 and/or network connectivity (e.g., bandwidth, throughput, etc.) associated with the transaction terminal 120. In these embodiments, the readable ID generator 160 may generate/distribute a larger number readable IDs per request if the readable ID generator 160 determines that the transaction terminal 120 is located at a location that is known to have limited Internet connectivity (e.g., 4G service, cellular connectivity, etc.) as opposed to a location that has better Internet connectivity (e.g., 5G service, Wi-Fi connectivity, etc.), or if the readable ID generator 160 determines that one or more network connectivity parameters (e.g., bandwidth or throughput) associated with the transaction terminal 120 are below certain threshold(s) as opposed to when such parameter(s) are above the threshold(s). In this way, the readable ID generator 160 can ensure that a sufficient number of readable IDs are generated/distributed to those transaction terminals 120 that are more likely to use up the readable IDs at a faster rate or that have a higher chance of not being able to reconnect to the readable ID generator 160 to obtain more readable IDs.

One skilled in the art would readily recognize that, in practice, the readable ID generator 160 can receive hundreds, thousands, millions, etc. of requests from hundreds, thousands, millions, etc. of transaction terminals 120, and can process those requests by sending and receiving solutions to hundreds, thousands, millions, etc. of proof-of-work problems. In this way, the readable ID generator 160 can handle such requests in a manner that cannot be possibly be performed manually or objectively by a human actor.

Further, one skilled in the art would also readily recognize that embodiments of the method described herein are necessarily tied to computer technology, requiring hardware and/or software that are equipped to solve cryptographic challenge puzzles. Furthermore, embodiments of the method provide the practical solution of system protection by way of cryptographic challenges, which advantageously obviates the need for password/key-related protection mechanisms. System attackers are discouraged from attacking by virtue of the asymmetric loss of compute resources that would result from conducting any such attacks.

In some embodiments, the readable ID generator 160 may be configured with AI/ML functionality for learning how to control generation/distribution of readable IDs to different transaction terminals 120. In certain embodiments, the AI/ML functionality may include one or more reinforcement learning (RL) algorithms. In various embodiments, information regarding readable ID usage patterns by a transaction terminal 120 (e.g., the rate at which issued readable IDs are used by the terminal) and/or network connectivity trends associated with the terminal (e.g., hours of the day, days of the week, weeks of the month, or months of the year when the terminal is located in areas with poor Internet connectivity or when bandwidth/throughput of its network connection falls below certain threshold(s)) may be provided as input to a reinforcement AI/ML model, which may perform learning to automate future control of readable ID generation/distribution speed and/or quantities. For example, the AI/ML model may be trained based on known inputs (e.g., generation/distribution of certain quantities of readable IDs to a transaction terminal 120) and known outputs (e.g., frequency of requests for readable IDs by the transaction terminal 120). In some embodiments, the AI/ML model may be refined based on feedback received from a user/operator of the transaction terminal 120 and/or from one or more other devices (e.g., management device(s)). For example, the transaction terminal 120 and/or one or more other devices may provide feedback indicating whether determined the range of readable IDs (e.g., a hundred IDs, a thousand IDs, etc.) issued by the readable ID generator 160 was sufficient or insufficient to address the payment transactions that occurred over a particular period of time. When the feedback indicates that a particular generation/distribution is useful and/or helpful, the AI/ML model may be trained to effect future generation/distribution based on the particular generation/distribution (e.g., to generate/distribute readable IDs in a manner similar to that in which the particular generation/distribution was made). When the feedback indicates that a particular generation/distribution is not useful and/or helpful, the AI/ML model may be trained not to effect future generations/distributions based on the particular generation/distribution (e.g., not to generate/distribute readable IDs in a manner similar to that in which the particular generation/distribution was made). In this way, the AI/ML functionality can learn how to best generate/distribution readable IDs for different transaction terminals 120, which improves the efficacy of the generation/distribution, and conserves processor and/or storage resources that may otherwise be used to generate and store rules for controlling generation/distribution of readable IDs. In various embodiments, the AI or ML functionality may be configured to reduce any error in the generation/distribution of readable IDs. In this way, any error that may be present may be provided as feedback to the algorithm(s), such that the error may tend to converge toward zero as the algorithm(s) are utilized more and more.

It is to be understood and appreciated that, although one or more of FIGS. 1 and 2 might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various devices, terminals, systems, generators, backends, etc. may have been illustrated in one or more of FIGS. 1 and 2 as separate devices, terminals, systems, generators, backends, etc., it will be appreciated that multiple devices, terminals, systems, generators, backends, etc. can be implemented as a single device, terminal, system, generator, backend, etc., or a single device, terminal, system, generator, backend, etc. can be implemented as multiple devices, terminals, systems, generators, backends, etc. Additionally, functions described as being performed by one device, terminal, system, generator, backend, etc. may be performed by multiple devices, terminals, systems, generators, backends, etc., or functions described as being performed by multiple devices, terminals, systems, generators, backends, etc. may be performed by a single device, terminal, system, generator, backend, etc.

Figure 3A:
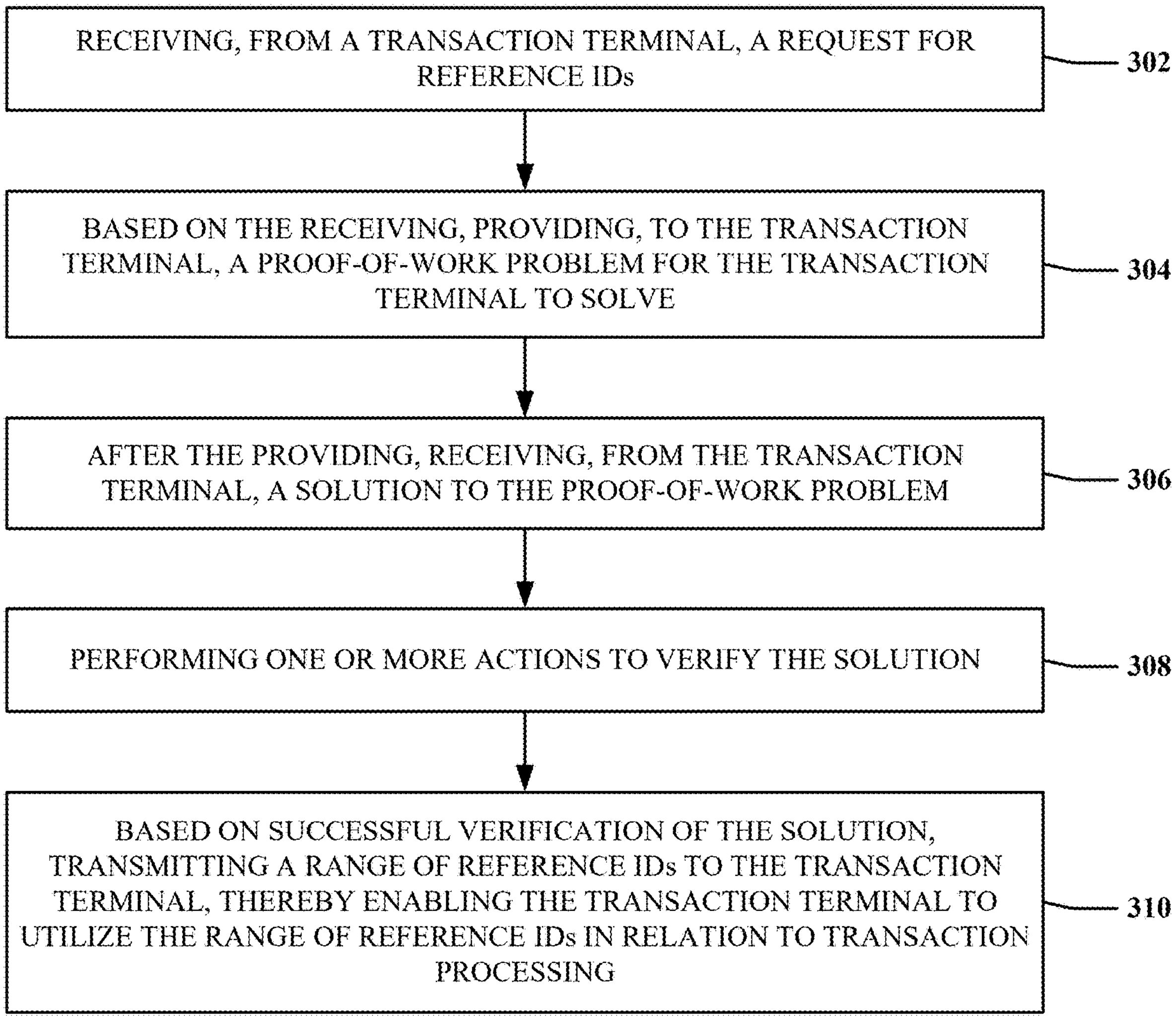
FIG. 3A depicts an illustrative embodiment of a method in accordance with various aspects described herein.

FIG. 3A depicts an illustrative embodiment of a method 300 in accordance with various aspects described herein.

At 302, the method can include receiving, from a transaction terminal, a request for reference IDs. For example, the readable ID generator 160 may, similar to that described above with respect to FIG. 2, perform one or more operations that include receiving, from a transaction terminal, a request for reference IDs.

At 304, the method can include based on the receiving, providing, to the transaction terminal, a proof-of-work problem for the transaction terminal to solve. For example, the readable ID generator 160 may, similar to that described above with respect to FIG. 2, perform one or more operations that include based on the receiving, providing, to the transaction terminal, a proof-of-work problem for the transaction terminal to solve.

At 306, the method can include after the providing, receiving, from the transaction terminal, a solution to the proof-of-work problem. For example, the readable ID generator 160 may, similar to that described above with respect to FIG. 2, perform one or more operations that include after the providing, receiving, from the transaction terminal, a solution to the proof-of-work problem.

At 308, the method can include performing one or more actions to verify the solution. For example, the readable ID generator 160 may, similar to that described above with respect to FIG. 2, perform one or more operations that include performing one or more actions to verify the solution.

At 310, the method can include based on successful verification of the solution, transmitting a range of reference IDs to the transaction terminal, thereby enabling the transaction terminal to utilize the range of reference IDs in relation to transaction processing. For example, the readable ID generator 160 may, similar to that described above with respect to FIG. 2, perform one or more operations that include based on successful verification of the solution, transmitting a range of reference IDs to the transaction terminal, thereby enabling the transaction terminal to utilize the range of reference IDs in relation to transaction processing.

While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3B:
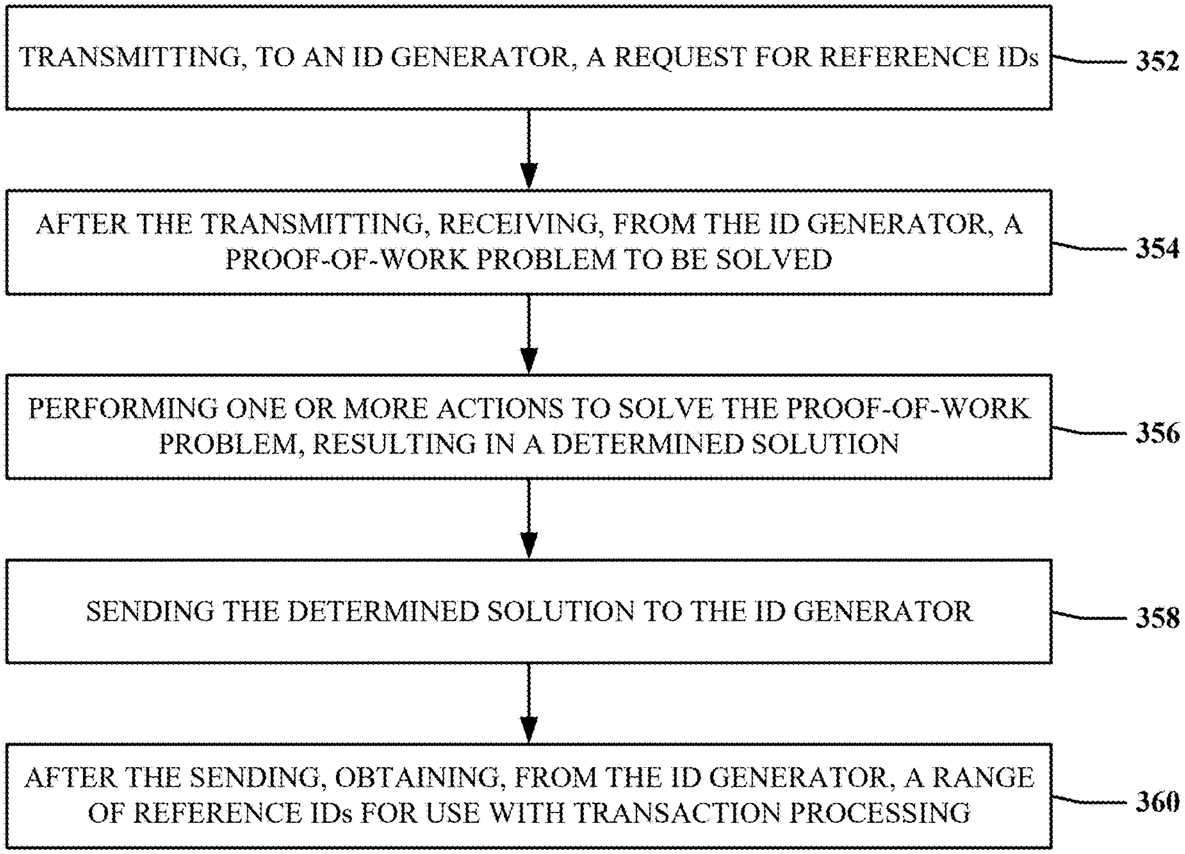
FIG. 3B depicts an illustrative embodiment of a method in accordance with various aspects described herein.

FIG. 3B depicts an illustrative embodiment of a method 350 in accordance with various aspects described herein.

At 352, the method can include transmitting, to an ID generator, a request for reference IDs. For example, the transaction terminal 120 may, similar to that described above with respect to FIG. 2, perform one or more operations that include transmitting, to an ID generator, a request for reference IDs.

At 354, the method can include after the transmitting, receiving, from the ID generator, a proof-of-work problem to be solved. For example, the transaction terminal 120 may, similar to that described above with respect to FIG. 2, perform one or more operations that include after the transmitting, receiving, from the ID generator, a proof-of-work problem to be solved.

At 356, the method can include performing one or more actions to solve the proof-of-work problem, resulting in a determined solution. For example, the transaction terminal 120 may, similar to that described above with respect to FIG. 2, perform one or more operations that include performing one or more actions to solve the proof-of-work problem, resulting in a determined solution.

At 358, the method can include sending the determined solution to the ID generator. For example, the transaction terminal 120 may, similar to that described above with respect to FIG. 2, perform one or more operations that include sending the determined solution to the ID generator.

At 360, the method can include after the sending, obtaining, from the ID generator, a range of reference IDs for use with transaction processing. For example, the transaction terminal 120 may, similar to that described above with respect to FIG. 2, perform one or more operations that include after the sending, obtaining, from the ID generator, a range of reference IDs for use with transaction processing.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
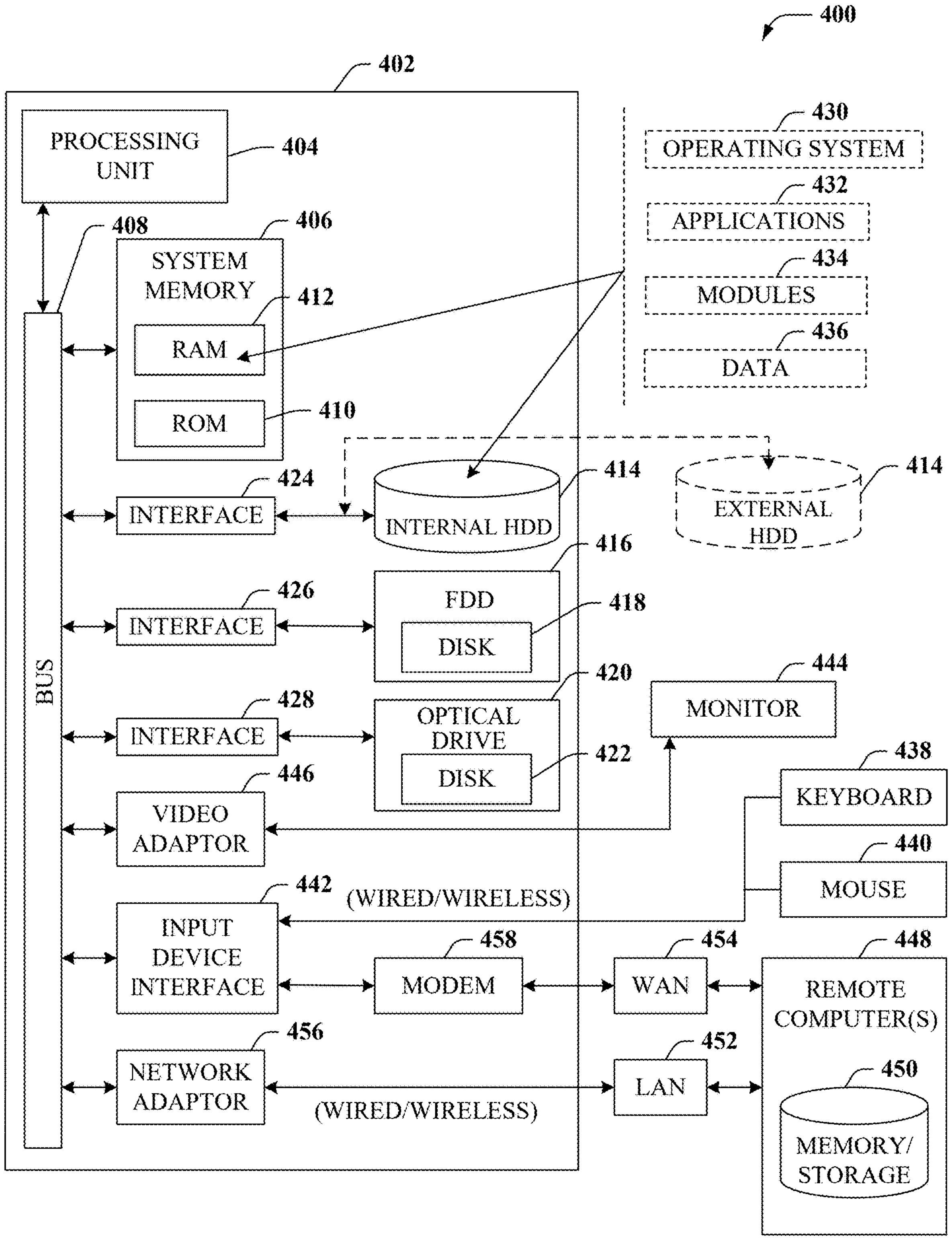
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate, in whole or in part, leveraging proof-of-work to securely generate short (and more readable) transaction reference numbers for receipts printed/provided by a terminal.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A device, comprising:

a processing system including a processor; and a memory that stores executable instructions that, when executed by the processing system, facilitate performance of operations, the operations comprising:

receiving, from a transaction terminal, a request for reference IDs, wherein at least one of the reference IDs comprises a value having a determined short length that facilitates user verbal communication of the at least one of the reference IDs during customer service after a corresponding transaction has been completed;

based on the receiving, providing, to the transaction terminal, a proof-of-work problem for the transaction terminal to solve;

after the providing, receiving, from the transaction terminal, a solution to the proof-of-work problem;

performing one or more actions to verify the solution; and based on successful verification of the solution, transmitting a range of reference IDs to the transaction terminal, thereby enabling the transaction terminal to utilize the range of reference IDs in relation to transaction processing.

2. The device of claim 1, wherein the proof-of-work problem comprises a cryptographic challenge puzzle whose solution satisfies one or more criteria.

3. The device of claim 1, wherein the transaction terminal utilizes the range of reference IDs in relation to transaction processing by printing or including respective reference IDs in the range of reference IDs on receipts for individual transactions.

4. The device of claim 1, wherein the transmitting further enables the transaction terminal to provide used reference IDs to a payment processor backend for the transaction processing.

5. The device of claim 1, wherein communications between the device and the transaction terminal do not require use of passwords, keys, or certificates.

6. The device of claim 1, wherein the operations further comprise generating the range of reference IDs.

7. The device of claim 1, wherein one or more of the reference IDs in the range of reference IDs have a length that is less than a predefined number of characters.

8. The device of claim 1, wherein the device is operated by a financial institution with which an operator of the transaction terminal has an account.

9. The device of claim 1, wherein the receiving is by way of an application programming interface (API) call.

10. A non-transitory machine-readable medium, comprising executable instructions that, when executed by a processing system including a processor, facilitate performance of operations, the operations comprising:

transmitting, to an ID generator, a request for reference IDs, wherein at least one of the reference IDs comprises a value having a determined short length that facilitates user verbal communication of the at least one of the reference IDs during customer service after a corresponding transaction has been completed;

after the transmitting, receiving, from the ID generator, a proof-of-work problem to be solved;

performing one or more actions to solve the proof-of-work problem, resulting in a determined solution;

sending the determined solution to the ID generator; and after the sending, obtaining, from the ID generator, a range of reference IDs for use with transaction processing.

11. The non-transitory machine-readable medium of claim 10, wherein the proof-of-work problem comprises a cryptographic challenge puzzle whose solution satisfies one or more criteria.

12. The non-transitory machine-readable medium of claim 10, wherein communications between the processing system and the ID generator do not require use of passwords, keys, or certificates.

13. The non-transitory machine-readable medium of claim 10, wherein one or more of the reference IDs in the range of reference IDs have a length that is less than a predefined number of characters.

14. The non-transitory machine-readable medium of claim 10, wherein the processing system is included in a transaction terminal that is configured to process card-present transactions.

15. The non-transitory machine-readable medium of claim 10, wherein the transmitting is by way of an application programming interface (API) call.

16. A method, comprising:

receiving, by a processing system including a processor, and from a transaction terminal, a request for reference IDs, wherein at least one of the reference IDs comprises a value having a determined short length that facilitates user verbal communication of the at least one of the reference IDs during customer service after a corresponding transaction has been completed;

based on the receiving, providing, by the processing system, and to the transaction terminal, a cryptographic challenge puzzle for the transaction terminal to solve;

after the providing, receiving, by the processing system, and from the transaction terminal, a solution to the cryptographic challenge puzzle;

performing, by the processing system, one or more actions to verify the solution; and based on successful verification of the solution, transmitting, by the processing system, a range of reference IDs to the transaction terminal, thereby enabling the transaction terminal to print or include respective reference IDs in the range of reference IDs on receipts for individual card-present transactions.

17. The method of claim 16, wherein communications between the processing system and the transaction terminal do not require use of passwords, keys, or certificates.

18. The method of claim 16, further comprising generating the range of reference IDs.

19. The method of claim 16, wherein one or more of the reference IDs in the range of reference IDs have a length that is less than a predefined number of characters.

20. The method of claim 16, wherein the processing system is operated by a financial institution with which an operator of the transaction terminal has an account.

* * * * *